Figure 1:
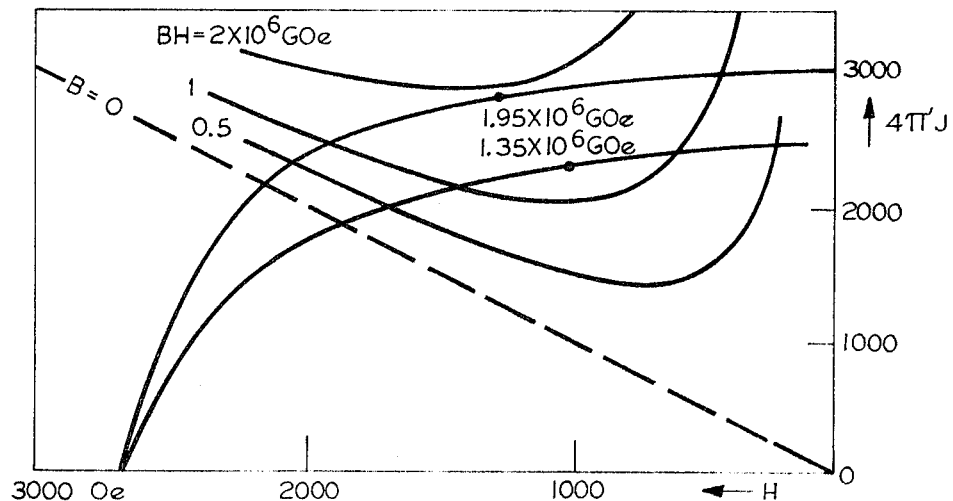

United States Patent

[11] 3,596,350

[72] Inventor Erich Steingroever
     Bonn, Germany
[21] Appl. No. 758,970
[22] Filed Sept. 11, 1968
[45] Patented Aug. 3, 1971
[73] Assignee Magnetfabrik Bonn GmbH. vorm.
     Gewerkschaft, Windhorst
     Postfach, Germany
[32] Priority May 8, 1968
[33] Germany
[31] P 17 64 279.4

[54] PROCESS FOR THE PRODUCTION OF PERMANENT MAGNETS FROM ANISOTROPIC PERMANENT MAGNET POWDER
14 Claims, 3 Drawing Figs.

[52] U.S. Cl. ........................................ 29/608,
     252/62.63, 264/24, 264/108
[51] Int. Cl. ........................................ H01f 7/06
[50] Field of Search ........................................ 29/604,
     608; 264/24, 108; 252/62.56, 62.63

[56] References Cited
UNITED STATES PATENTS

| | | | |
|---|---|---|---|
| 2,849,312 | 8/1958 | Peterman | 29/608 X |
| 2,965,953 | 12/1960 | Baermann | 264/24 |
| 2,984,866 | 5/1961 | Schwabe | 264/24 |
| 2,999,271 | 9/1961 | Falk et al. | 264/24 |
| 3,189,667 | 6/1965 | Buttner et al. | 264/24 |
| 3,256,591 | 6/1966 | Muller | 29/608 |
| 3,458,927 | 8/1969 | Wiechec | 29/608 X |

FOREIGN PATENTS

| | | | |
|---|---|---|---|
| 1,018,139 | 10/1957 | Germany | 29/608 |

Primary Examiner—John F. Campbell
Assistant Examiner—Carl E. Hall
Attorney—Christen and Sabol

ABSTRACT: A process for producing permanent magnets from an isotropic permanent magnet powder which is compressed by means of a magnetic field but which is first exposed to a magnetic field and then loosened whereby the particles of the magnetic powder are particularly adaptable for easy alignment in the magnetic field during compression.

PROCESS FOR THE PRODUCTION OF PERMANENT MAGNETS FROM ANISOTROPIC PERMANENT MAGNET POWDER

The invention concerns a process for the production of permanent magnets from anisotropic permanent magnet powder through compressing in a magnetic field.

It has been known to produce permanent magnets from anisotropic permanent magnet powder, if need be with a binder, through compressing in a magnetic field. At the same time the nonmagnetic powder if need be was mixed with the binder, was filled into the mold, then the magnetic field was switched on and the pressed article was produced through descent of the press ram into the matrix.

The inventor has set for himself the task of improving the magnetic values of the magnets produced in accordance with this process. He has realized that the powder particles when they are exposed to the magnetic field align themselves only imperfectly even if high field intensities of 12,000 Oersteds are used. Rather, the particles form agglomerates which will adjust themselves only with their resultant in the direction of the field, whereby the individual particles may still be directioned differently from the field direction.

Consequently the magnetic values of the magnets produced in such a manner are relatively low.

In accordance with the present invention, the permanent magnet powder, prior to compression, is exposed to a magnetic field and is simultaneously or subsequently loosened, so that the agglomerates are dissolved and a powder will develop which is well capable of alignment.

The loosening up of the powder and the breaking up of the agglomerates can be accomplished mechanically in a simple manner by stirring the powder in the mold or by vibrating it while the field of direction is applied. The powder, however, can also be exposed to a magnetic field prior to being filled into the mold and can then be loosened through stirring, through drumming or else through mixing with binders or with a portion of powder which has not been premagnetized.

A particularly advantageous execution of the process according to the present invention is that powders mixed with the binder are first exposed to a strong magnetic field sufficient for a complete remagnetization of the particles lying in field direction and then to a weaker magnetic alternating field, e.g., 50 Hz., so that the order of the particles brought about by the first field is destroyed and the agglomerates are dissolved. It will be effective to expose this powder once more to the remagnetizing field and the alternating field, in order to obtain a powder which is particularly capable of taking direction. But the magnetic alternating field is to be only strong enough that it will be sufficient for a thorough loosening of the powder but that it will not yet demagnetize or unmagnetize. The powder treated in this manner can now be compressed in a known manner in a mold in the magnetic field into permanent magnet bodies.

The improvement of the (B. H.) maximum value through the process according to the invention can be seen from the following table:

| Type of Powder | Not Pretreated | Premagnetized and Loosened up According to the Invention |
| --- | --- | --- |
| Barium ferrite +3% binder | $1.35 \cdot 10^6 \, G \cdot Oe$ | $1.95 \cdot 10^6 \, G \cdot Oe$ |
| Alnico 450 + 2.4% binder | $1.0 \cdot 10^6 \, G \cdot Oe$ | $1.45 \cdot 10^6 \, G \cdot Oe$ |

Figure 2:
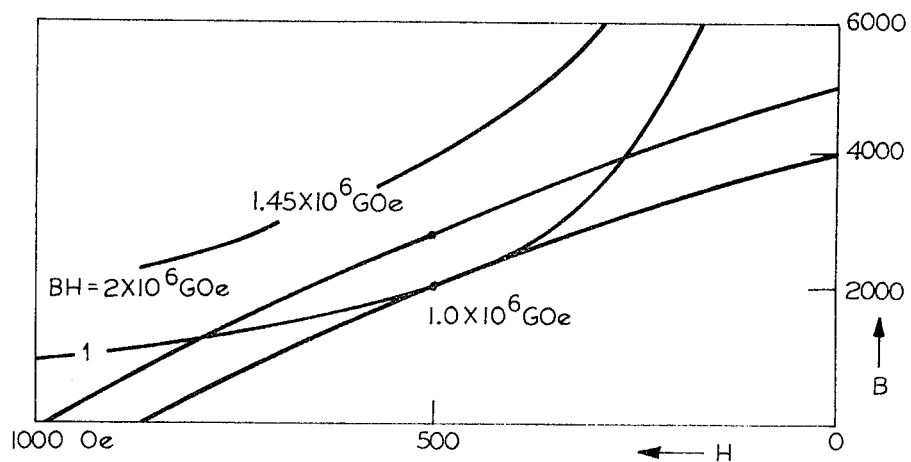
Figure 3:
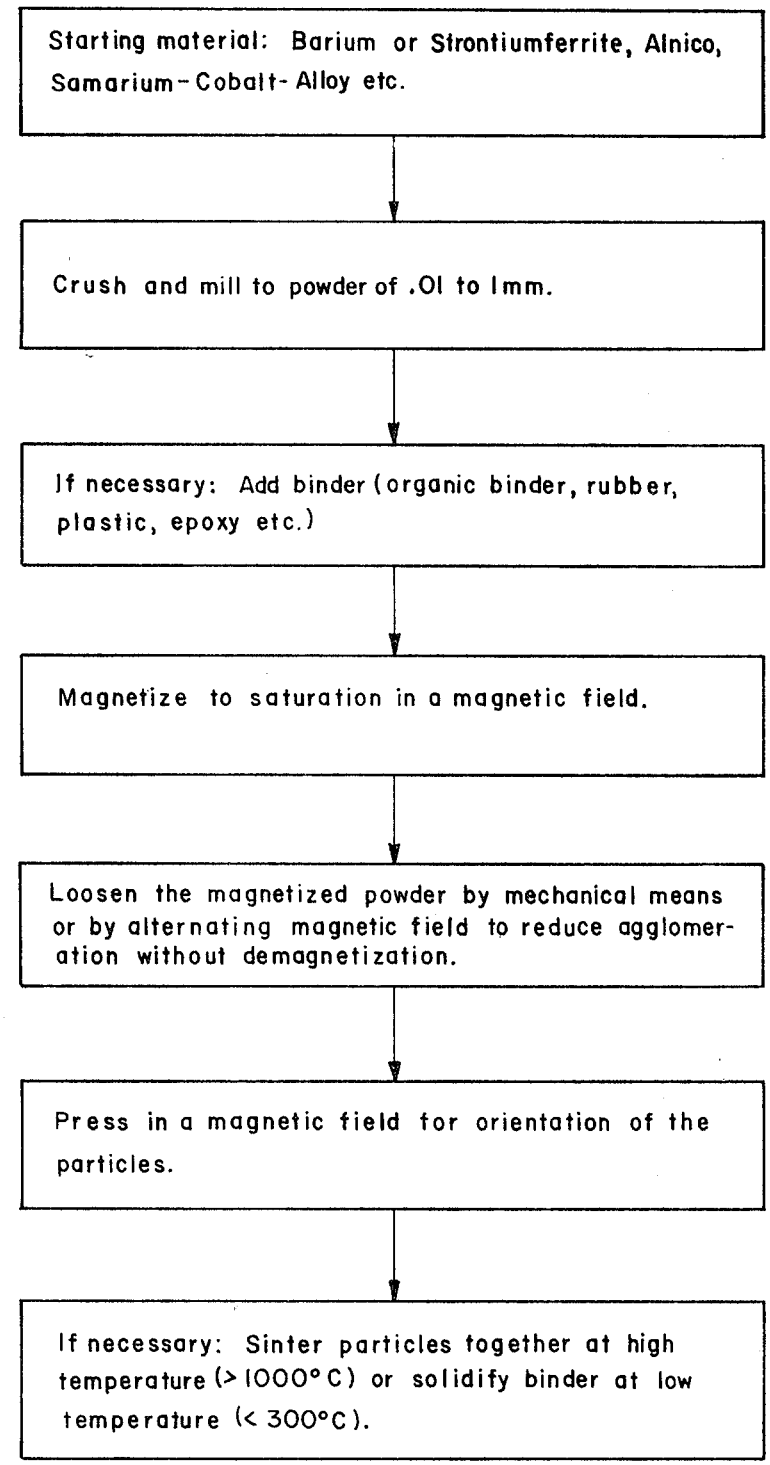

The magnetization curves of the barium ferrite magnets mentioned in the table have been rendered in FIG. 1, those of Alnico magnets in FIG. 2, and FIG. 3 is a flow chart of the various steps employed in this process.

The process of premagnetizing and loosening of the powder according to the invention, can be applied advantageously in the case of production of permanent magnets of all kinds; therefore, not only in the case of ferrite magnets and alnico alloys, but also in the case of magnets made of MnAl alloys, of cobalt compounds with rare earths, etc., as well as in the production of pressed articles which subsequently are sintered or calcined into solid magnet bodies.

The premagnetizing and loosening can take place, according to the invention, both in the actual mold as well as outside of it. In the case of the last-mentioned method of operation, a large quantity of powder can be prepared ready to be pressed. According to the invention, it can be much to the purpose to mix the pretreated powder with a portion of nonpretreated powder, as a result of which the achievable magnetic values drop off only little, the fusibility of the mixture however is improved considerably, so that the filling into the mold is made easier.

It has been ascertained that is is possible to align the powder which had been pretreated according to the invention, in the mold by application of the magnetic directional field and then to carry out the compressing process without magnetic field; in the case of this execution of the process only a small drop in the magnetic values will occur as compared to the values of the magnets produced in the case of a simultaneously applied magnetic field.

The process according to the invention is suitable for the production of permanent magnets with any given position and shape of the privileged direction.

The process according to the invention can also be of use in the case of production of extruded permanent magnets with a plastic binder. In this case the permanent magnet powder is treated according to the invention with the binder prior to or after the mixing, and is exposed in the extruder, in a manner known in itself, to a magnetic directional field. Likewise, magnets can be produced by the injection molding method from a powder which has been pretreated according to the invention and with the use of a magnetic field.

Inasmuch as the present invention is subject to many variations, modifications and changes in detail, it is intended that all matter contained in the foregoing description or shown in the accompanying drawing shall be interpreted as illustrative and not in a limiting sense.

What I claim is:

1. Process for the production of anisotropic permanent magnets from powder suitable for the forming of solid anisotropic magnetic bodies by compression, comprising the steps of subjecting said powder to a magnetic field strong enough for saturation of said powder causing agglomeration of the particles of said powder, loosening said saturated powder to reduce agglomeration of said particles without demagnetizing single particles of said powder, and compressing said powder in a magnetic field in a mold.

2. The invention as recited in claim 1, characterized in that the loosening is accomplished mechanically.

3. The process defined in claim 1, which includes the step of loosening said powder by subjecting the saturated powder to an alternating magnetic field insufficient to demagnetize said particles.

4. The process defined in claim 1, which includes the additional steps of subjecting said loosened powder to a strong magnetic field having a fixed orientation and again loosening said powder.

5. The process defined in claim 1, which includes the additional steps of subjecting said powder to a magnetic field having a fixed orientation while said powder is being compressed in said mold.

6. The invention as recited in claim 1 characterized in that the magnetized and loosened powder is mixed with a portion of nonpretreated powder in order to improve the fusibility.

7. The invention as recited in claim 1 characterized in that the magnetizing and loosening of the magnet powder is accomplished inside a mold.

8. The invention as recited in claim 1 characterized in that the magnetizing and loosening of the magnet powder is accomplished outside of a mold.

9. The process defined in claim 4, which includes the additional steps of removing the body from the mold after said compression, and subjecting said removed body to additional compression in the absence of a magnetic field.

10. The invention as recited in claim 1 characterized in that a binder is applied to the magnet powder.

11. The invention as recited in claim 1 characterized in that the compacted powder is solidified through sintering.

12. The invention as recited in claim 1 characterized in that the compacted powder is solidified through calcining.

13. The invention as recited in claim 10 characterized in that said binder and magnet powder are extruded into a permanent magnet.

14. The invention as recited in claim 10 characterized in that said binder and magnet powder are injection molded into a permanent magnet.